(12) United States Patent
Stavely et al.

(10) Patent No.: US 7,016,604 B2
(45) Date of Patent: Mar. 21, 2006

(54) AUTOFOCUS USING A HOLOGRAPHIC APERTURE ELEMENT

(75) Inventors: Donald J. Stavely, Windsor, CO (US); David K. Campbell, Loveland, CO (US); Eric F. Aas, Windsor, CO (US); Gregory V. Hofer, Loveland, CO (US); Scott A. Woods, Bellvue, WA (US); Dan L. Dalton, Greeley, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 77 days.

(21) Appl. No.: 11/089,553

(22) Filed: Jun. 12, 2004

(65) Prior Publication Data

US 2005/0276592 A1    Dec. 15, 2005

(51) Int. Cl.
G03B 13/36    (2006.01)

(52) U.S. Cl. ..................... 396/111; 348/349
(58) Field of Classification Search ............... 396/111; 348/349
See application file for complete search history.

(56) References Cited

U.S. PATENT DOCUMENTS

| | | | | |
|---|---|---|---|---|
| 4,310,227 A | * | 1/1982 | Zinchuk | 396/106 |
| 4,474,446 A | * | 10/1984 | Reynolds et al. | 396/111 |
| 6,021,005 A | * | 2/2000 | Cathey et al. | 359/737 |
| 6,115,556 A | * | 9/2000 | Reddington | 396/267 |

* cited by examiner

Primary Examiner—W. B. Perkey

(57) ABSTRACT

Autofocus methods and digital cameras employing a holographic element or hologram. The holographic element generates one or more displaced images that are processed to generate a bipolar contrast signal that provides for improved autofocus performance of the digital camera.

8 Claims, 3 Drawing Sheets

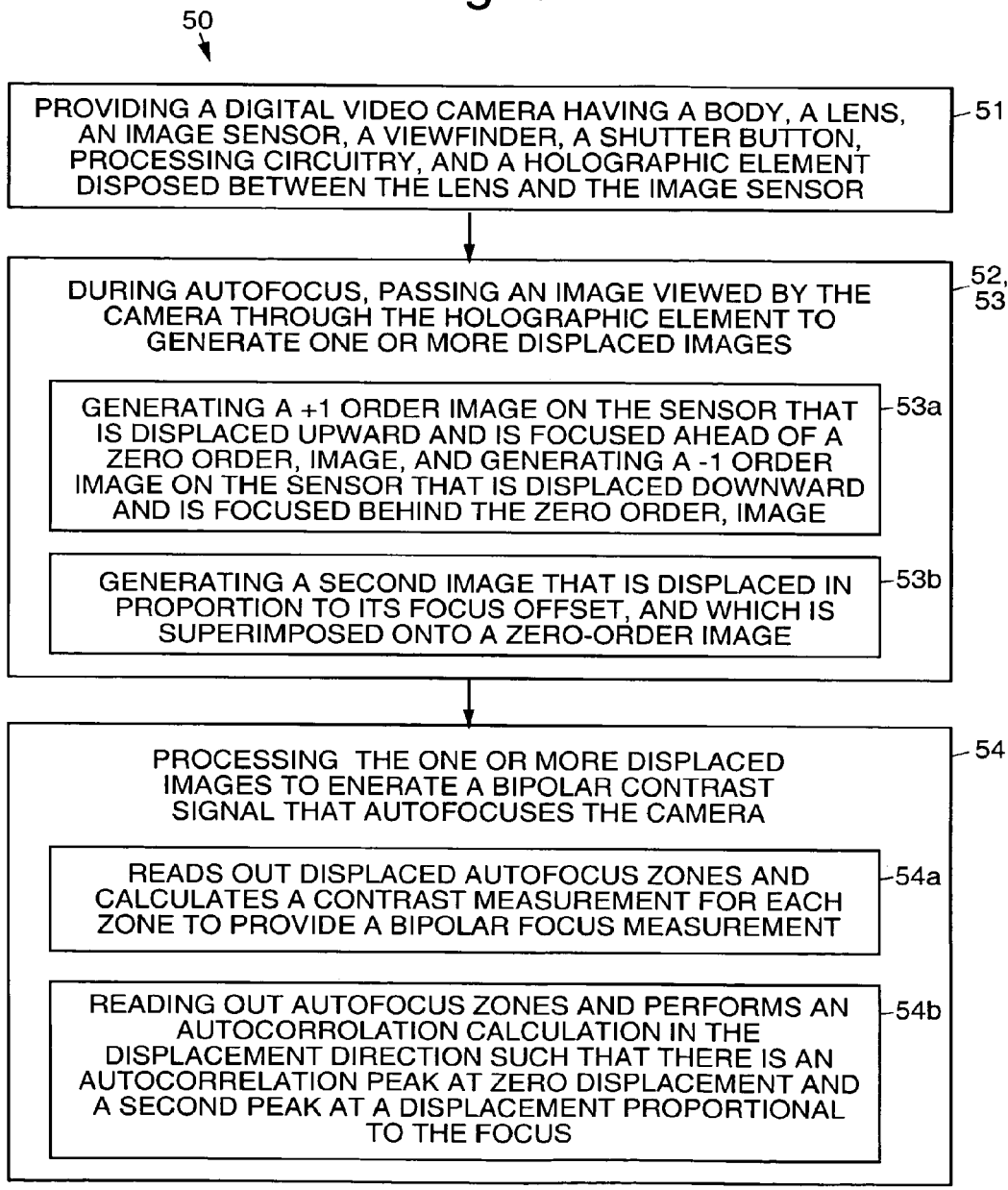

AUTOFOCUS USING A HOLOGRAPHIC APERTURE ELEMENT

TECHNICAL FIELD

The present invention relates generally to digital cameras, and more specifically, to the use of a holographic aperture element to autofocus a digital camera.

BACKGROUND

There are two basic methods of providing autofocus in a digital camera. The first and most common method directly uses a lens and sensor. This is, of course, the simplest and lowest cost solution.

When a user pushes a shutter button part-way down, the camera takes a series of exposures while moving the lens through the focus range. A region of the sensor is read out, and some sort of focus "figure of merit" value is generated. The camera tries to identify the peak of this signal, signifying the position of best focus.

The focus value is derived from the sharpness or "contrast" of the image in the focus region. This can be generated in the spatial frequency domain as a measure the high frequency content. It can also be calculated in the spatial domain as the sum of differences of neighboring pixels. Often the measurement is made in both horizontal and vertical directions to make best use of whatever spatial contrast exists in the focus zone.

The problem with these contrast methods of autofocus is that they rely on a single, or "unipolar" measure of focus. The camera must find the peak of this unipolar signal. Ideally, the camera would sweep though the entire focus range, but this would be unacceptably slow. An alternative is to move from far focus inward, and try to identify the peak after just passing it. This technique is susceptible to false peaks in some scenes, resulting in focus failure.

A second autofocus technique relies on technology developed for film cameras. A separate autofocus module looks at a focus zone in the scene, either though the main lens or through separate optical components. These optical components include optical elements such as prisms or beamsplitters, and special sensor arrays. A focus error signal is generated with sensor and processing circuitry within the autofocus module.

The separate autofocus modules described above generate a "bipolar" focus error signal. This gives not only a measure of focus error, but a direction. The camera moves in the direction that reduces the error signal to zero. This is faster and more robust than using unipolar focus measurements.

However, what is needed is a way to generate a bipolar focus signal using the main lens and sensor. This would have the performance of the dedicated modules without incurring the increase in cost and complexity.

Holographic elements have heretofore been used in camera auto-focusing systems. For example, U.S. Pat. No. 5,471,046 issued to Meyers discloses a camera auto-focusing system with a designator using a volume holographic element. U.S. Pat. No. 5,569,904 issued to Meyers discloses a multispot autofocus system, usable with a camera, includes a radiation emitter for emitting visible or infrared radiation. U.S. Pat. No. 6,381,072 issued to Burger discloses a stacked array magnifier that forms a magnified, demagnified or unit image of an object.

U.S. Pat. No. 5,978,607 issued to Teremy et al. discloses a photographic, digital or video camera including at least one sensor, and a viewfinder including a holographic element. U.S. Pat. No. 5,212,375 issued to Goto et al. discloses an imaging system having a focus detecting device that performs focus detection by detecting an output signal indicative of intensity distribution of light derived from a light-receiving element, in which at least one holographic optical element is arranged on the object side of a primary imaging plane to form an image on the light-receiving element. U.S. Pat. No. 4,993,789 issued to Biles et al. discloses a polarization-selective holographic element having first and second holographic layers.

However, none of the above-cited patents disclose or suggest the use of a holographic element for generating one or more displaced images that are processed to produce a bipolar contrast signal that indicates the direction of best focus and thus improve the autofocus performance of a digital camera.

SUMMARY

The present invention provides a digital camera having a shutter button and an aperture wheel comprising a focus aperture that includes a holographic element or hologram. During autofocus, the holographic element is used to generate one or more displaced images that are processed to produce a bipolar contrast signal that indicates the direction of best focus. This provides for improved autofocus performance of the digital camera.

The holographic element modifies the image viewed by the camera. The holographic element creates one or more displaced images at focus distances ahead of and behind a point (or plane) of normal focus. The holographic element also (laterally, such as upwardly and downwardly) displaces these additional images.

When a user partially depresses a shutter button, the camera switches to the focus aperture. The camera reads each focus zone (where the one or more displaced images are located), and measures the spatial contrast or high frequency content of the image in the respective zone. Since the holographic element creates one or more images that are displaced in focus, the camera determines the direction of best focus.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 6 illustrates exemplary methods in accordance with the principles of the present invention.

DETAILED DESCRIPTION

Figure 1:
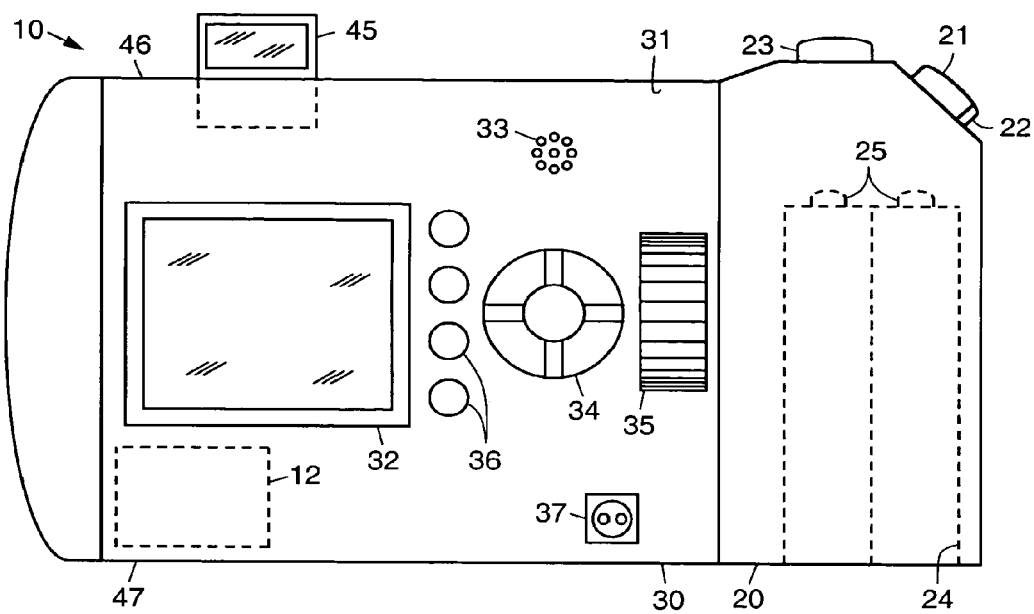
FIG. 1 illustrates a rear view of an exemplary-digital camera in accordance with the principles of the present invention.
Figure 2:
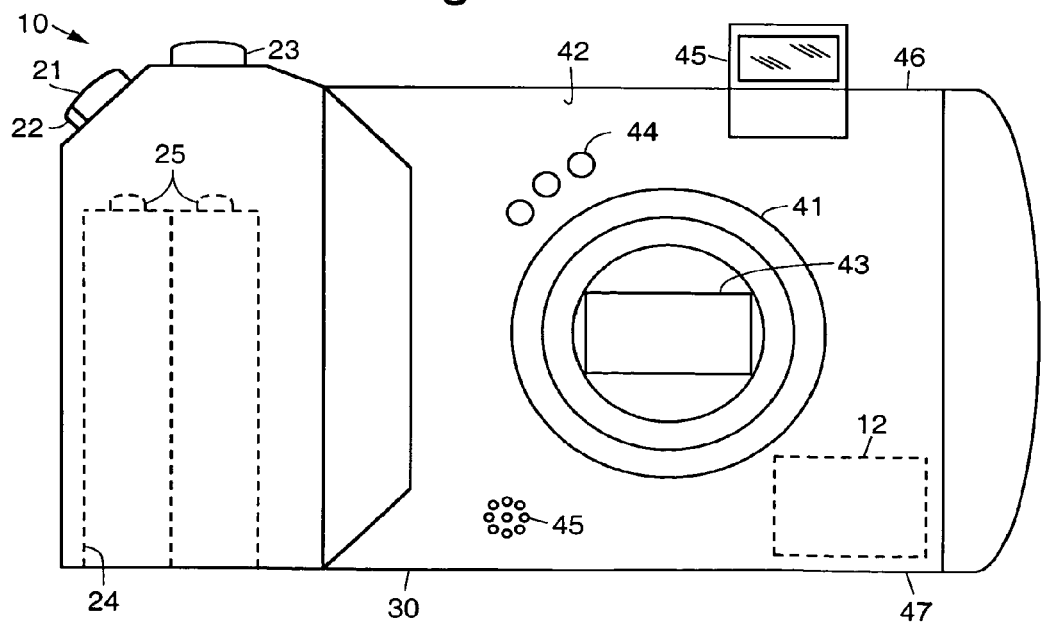
FIG. 2 illustrates a front view of the exemplary digital camera shown in FIG. 1.

Referring to the drawing figures, FIG. 1 illustrates a rear view of an exemplary digital camera 10 in accordance with the principles of the present invention, and FIG. 2 illustrates a front view of the exemplary digital camera 10. The exemplary digital camera 10 comprises a handgrip section 20 and a body section 30. The handgrip section 20 includes a power button 21 having a lock latch 22, a shutter button 23, and a battery compartment 24 for housing batteries 25.

A rear surface 31 of the body section 30 comprises a liquid crystal display (LCD) 32 or viewfinder 32, a rear microphone 33, a joystick pad 34, a zoom control dial 35, a plurality of buttons 36 for setting functions of the camera 10 and an output port 37 for downloading images to a computer, for example.

A lens 41, such as a zoom lens 41, for example, extends from a front surface 42 of the camera 10. A shutter 43 is disposed within the body section 30 that is visible behind the lens 41. One or more metering elements 44 are disposed on the front surface 42 of the camera 10. A front microphone 45 is disposed on the front surface 42 of the camera 10. A pop-up flash device 45 is disposed on an upper surface 46 of the camera 10.

Figure 3:
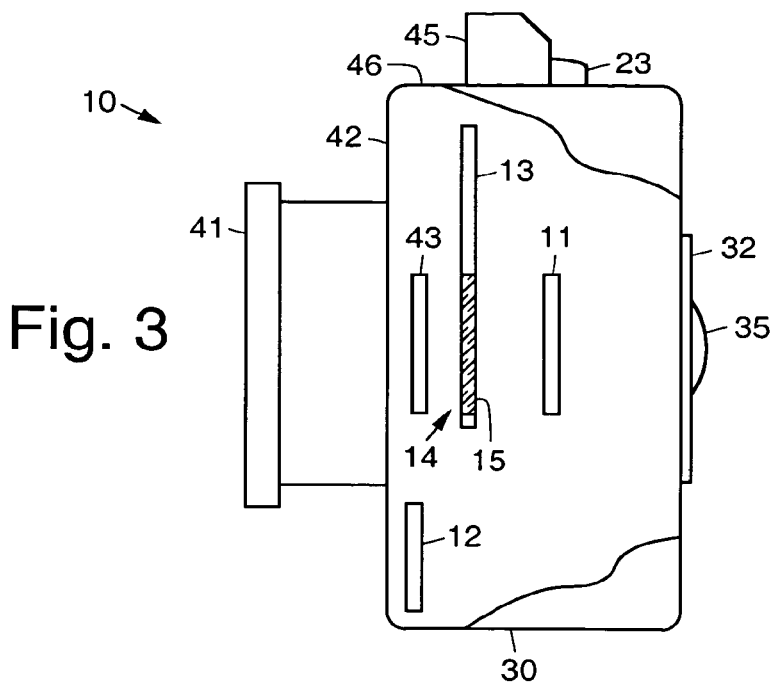
FIG. 3 illustrates a cross-sectional side view of the exemplary digital camera shown in FIG. 1 illustrating relevant interior components.

FIG. 3 illustrates a cross-sectional side view of the exemplary digital camera 10 shown in FIG. 1 illustrating relevant interior components. As is shown in FIG. 3, the interior components of the digital camera 10 include the shutter 43, an image sensor 11 and processing circuitry 12 electronically coupled to the image sensor 11. An aperture wheel 13 is disposed within the body 30 between the lens 41 (and the shutter 43) and the image sensor 11. The aperture wheel 13 includes a focus aperture 14 comprising a holographic element 15 in accordance with the present invention.

The holographic element 15 of the focus aperture 13 is used to modify the image that passes through the lens 41. The holographic element 15 is designed in such a way that additional images are generated at focus distances ahead of and behind the point (or plane) of normal focus of the lens 41. The holographic element 15 also (laterally, such as upwardly and downwardly) displaces these additional images.

When a user partially depresses the shutter button 15, the camera 10 switches to the focus aperture 13. In a manner similar to the contrast methods described above in the Background section, the camera 10 reads the focus zones containing the displaced images, and measures the spatial contrast or high frequency content of the image in the respective zone. However, since the holographic element 15 creates images that are displaced in focus on the sensor 11, the processing circuitry 12 in the camera 10 determines the direction of best focus.

Figure 4:
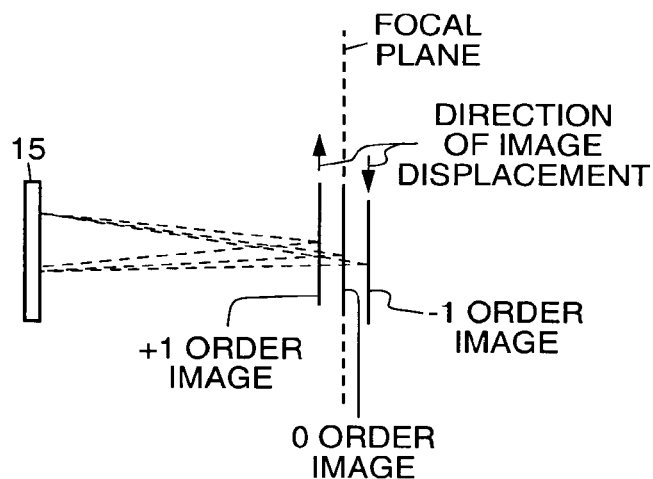
FIG. 4 illustrates a first exemplary embodiment of a holographic element in accordance with the principles of the present invention.

One exemplary design for the holographic element 15 (or hologram 15) is as follows, and which is illustrated in FIG. 4. When placed at the aperture position, the hologram 15 generates two additional images (+1 order and −1 order) on the sensor 11. The +1 order image is displaced upward and is focused ahead of the normal or "zero order" image. The −1 order image is displaced downward and is focused behind the normal or "zero order" image. The processing circuitry 12 of the camera 10 reads out the displaced autofocus zones and calculates a contrast measurement for each or them. Since one image is displaced forward in focus and one image is displaced behind, the difference is the desired bipolar focus measurement.

Figure 5:
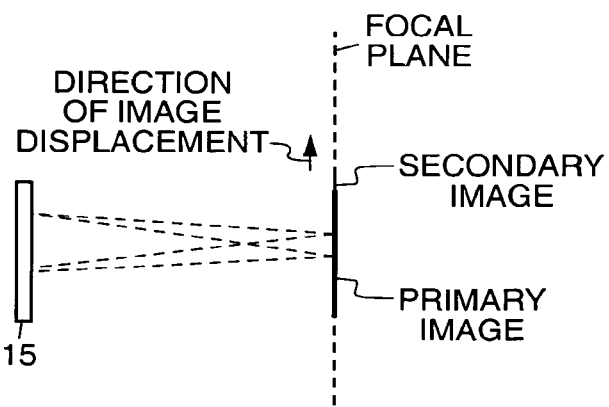
FIG. 5 illustrates a second exemplary embodiment of a holographic element in accordance with the principles of the present invention.

Another exemplary design for the hologram 15, which is illustrated in FIG. 5, creates a second image that is displaced in direct proportion to its focus offset. This displaced image is superimposed onto the normal or zero-order image. The processing circuitry 12 of the camera 10 reads out the autofocus zone and then performs an autocorrelation calculation in the displacement direction. There is an autocorrelation peak at zero displacement and a second peak at a displacement proportional to the focus error.

FIG. 6 illustrates exemplary methods 50 in accordance with the principles of the present invention. In the exemplary methods 50 a digital camera 10 is provided 51 that comprises a body 30, a lens 41, an image sensor 11, a viewfinder 32, a shutter button 23, processing circuitry 12, and a holographic element 15 disposed between the lens 41 and the image sensor 11. During autofocus, an image viewed by the camera 10 is passed 52 through the holographic element 15 to generate 53 one or more displaced images. The one or more displaced images are processed 54 by the processing circuitry 12 to generate a bipolar contrast signal that autofocuses the camera 10.

In a first exemplary method 50, the holographic element 15 generates a +1 order image on the sensor 11 that is displaced upward and is focused ahead of a normal, zero order, image, and generates a −1 order image on the sensor 11 that is displaced downward and is focused behind the normal, zero order, image. The processing circuitry 13 reads out displaced autofocus zones and calculates a contrast measurement for each zone to provide a bipolar focus measurement.

In a second exemplary method 50, the holographic element 15 creates a second image that is displaced in proportion to its focus offset, which is superimposed onto a normal, zero-order image. The processing circuitry 12 reads out autofocus zones and performs an autocorrelation calculation in the displacement direction such that there is an autocorrelation peak at zero displacement and a second peak at a displacement proportional to the focus error.

Thus, a digital camera and methods employing a holographic aperture element to autofocus the camera have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera comprising:
a body;
a lens;
an image sensor;
a shutter button;
processing circuitry; and
a holographic element disposed in the optical path of the lens and the image sensor, which holographic element generates an image that is processed by the processing circuitry to generate a bipolar signal to autofocus the camera.

2. The camera recited in claim 1 wherein the holographic element creates additional images at focus distances ahead of and behind a normal focus distance and displaces the additional images.

3. The camera recited in claim 1 wherein the holographic element generates a +1 order image on the sensor that is displaced upward and is focused ahead of a normal, zero order, image, and generates a −1 order image on the sensor that is displaced downward and is focused behind the normal, zero order, image, and wherein the processing circuitry reads out displaced autofocus zones and calculates a contrast measurement for each zone to provide a bipolar focus measurement.

4. The camera recited in claim 1 wherein the holographic element creates a second image that is displaced in proportion to its focus offset, which is superimposed onto a normal, zero-order image, and wherein the processing circuitry reads out autofocus zones and performs an autocorrelation calculation in the displacement direction such that there is an autocorrelation peak at zero displacement and a second peak at a displacement proportional to the focus error.

5. An autofocusing method for use with a digital camera comprises the steps of:
   providing a digital camera comprising a body, a lens, an image sensor, a shutter button, processing circuitry, and a holographic element disposed between the lens and the image sensor;
   during autofocus, passing an image viewed by the camera through the holographic element to generate an image; and
   processing the image to generate a bipolar contrast signal to autofocus the camera.

6. The autofocusing method recited in claim 5 wherein the holographic element creates additional images at focus distances ahead of and behind a normal focus distance and displaces the additional images.

7. The autofocusing method recited in claim 5 wherein the holographic element generates a +1 order image on the sensor that is displaced upward and is focused ahead of a normal, zero order, image, and generates a −1 order image on the sensor that is displaced downward and is focused behind the normal, zero order, image, and wherein the processing circuitry reads out displaced autofocus zones and calculates a contrast measurement for each zone to provide a bipolar focus measurement.

8. The autofocusing method recited in claim 5 wherein the holographic element creates a second image that is displaced in proportion to its focus offset, which is superimposed onto a normal, zero-order image, and wherein the processing circuitry reads out autofocus zones and performs an autocorrelation calculation in the displacement direction such that there is an autocorrelation peak at zero displacement and a second peak at a displacement proportional to the focus error.

* * * * *